(12) United States Patent
König

(10) Patent No.: US 10,521,985 B2
(45) Date of Patent: Dec. 31, 2019

(54) METHOD OF SECURELY OPENING DOORS AND A SYSTEM THAT SECURELY OPENS DOORS

(71) Applicant: Fujitsu Technology Solutions Intellectual Property GmbH, München (DE)

(72) Inventor: Christoph König, München (DE)

(73) Assignee: Fujitsu Technology Solutions Intellectual Property GmbH, München (DE)

( * ) Notice: Subject to any disclaimer, the term of this patent is extended or adjusted under 35 U.S.C. 154(b) by 463 days.

(21) Appl. No.: 15/498,597

(22) Filed: Apr. 27, 2017

(65) Prior Publication Data

US 2017/0316627 A1 Nov. 2, 2017

(30) Foreign Application Priority Data

Apr. 29, 2016 (DE) .................... 10 2016 108 013

(51) Int. Cl.
*G07C 9/00* (2006.01)
*H04W 12/04* (2009.01)

(52) U.S. Cl.
CPC ..... *G07C 9/00103* (2013.01); *G07C 9/00571* (2013.01); *H04W 12/04* (2013.01); *G07C 9/00309* (2013.01); *G07C 2009/0042* (2013.01)

(58) Field of Classification Search
CPC .............................. H04W 12/00; H04W 12/08
See application file for complete search history.

(56) References Cited

U.S. PATENT DOCUMENTS

| 9,640,001 | B1* | 5/2017 | Vazquez | G07C 9/00007 |
|---|---|---|---|---|
| 2008/0235516 | A1* | 9/2008 | Raghunath | G07C 9/00309 |
| | | | | 713/186 |
| 2008/0290990 | A1* | 11/2008 | Schaffzin | G07C 9/00182 |
| | | | | 340/5.64 |
| 2009/0183541 | A1 | 7/2009 | Sadighi et al. | |
| 2012/0068818 | A1 | 3/2012 | Mizon | |
| 2012/0074223 | A1* | 3/2012 | Habraken | G06Q 20/327 |
| | | | | 235/382 |
| 2012/0280783 | A1 | 11/2012 | Gerhardt et al. | |
| 2013/0022198 | A1* | 1/2013 | Willey | H04L 63/0492 |
| | | | | 380/255 |
| 2013/0212661 | A1* | 8/2013 | Neafsey | G06F 21/45 |
| | | | | 726/6 |

(Continued)

*Primary Examiner* — John F Mortell
(74) *Attorney, Agent, or Firm* — DLA Piper LLP (US)

(57) ABSTRACT

A method securely opens a door connected to a system and includes a central unit, a mobile terminal, a local control unit and a door opening device that are configured to transmit data. The method includes transmitting a first key to the mobile terminal by the central unit; transmitting the first key to the control unit by the mobile terminal via the door opening device; generating a second key by the control unit depending on the first key; transmitting the second key from the control unit to the mobile terminal via the door opening device; generating a third key by the mobile terminal depending on the second key; transmitting the third key to the central unit by the mobile terminal via the door opening device; and controlling opening of the door depending on the third key by the central unit by transmitting a request to the door opening device.

11 Claims, 2 Drawing Sheets

(56) References Cited

U.S. PATENT DOCUMENTS

| | | | |
|---|---|---|---|
| 2014/0090032 A1* | 3/2014 | Abuelsaad | H04L 63/0823 726/5 |
| 2015/0371214 A1* | 12/2015 | Schroder | H04L 63/0838 705/44 |
| 2019/0268736 A1* | 8/2019 | Billau | H04W 4/33 |

* cited by examiner

METHOD OF SECURELY OPENING DOORS AND A SYSTEM THAT SECURELY OPENS DOORS

TECHNICAL FIELD

This disclosure relates to a method of securely opening doors and a system that securely opens doors.

BACKGROUND

Systems and methods of opening doors are known. For example, such a system is a communication system comprising a door having a door opener and a camera. The camera is configured to take image data of visitors so that a resident of the house or the flat can cause the door to open remotely by the door opener. Furthermore, video home intercommunication systems are known comprising at least one interior unit for the flat having a microphone, speakers and a monitor, as well as an exterior unit, that also comprises a microphone, speakers and a camera. Such systems enable the resident to directly communicate with a person that wants to have access to the flat.

Such systems are particularly suitable for people with limited mobility, in particular older people.

Older people often wish to not be accommodated in rest or nursing homes, where they are faced with permanent support and care. Instead, older people tend to prefer their own home or house. However, in the worst case, this may lead to an emergency situation where help cannot be provided on time. There is a problem that emergency medical services or accident ambulances (when called) do not readily have access to the flat. For example, the emergency medical services would have to possess or obtain a physical door key to get access to the flat. Especially the latter case may cost valuable seconds for the rescue needed by the respective person.

It could therefore be helpful to provide a concept that contributes to securely opening a door without a physical door key.

SUMMARY

I provide a method of securely opening a door connected to a system including a central unit, a mobile terminal, a local control unit and a door opening device for the door that are configured to transmit data among one another, the method including transmitting a first key to the mobile terminal by the central unit, transmitting a received first key to the local control unit by the mobile terminal via the door opening device, generating a second key by the local control unit depending on the first key, transmitting the second key from the local control unit to the mobile terminal via the door opening device, generating a third key by the mobile terminal depending on the second key, transmitting the third key to the central unit by the mobile terminal via the door opening device, and controlling opening of the door depending on the third key by the central unit by transmitting a request to the door opening device.

I also provide a system that securely opens a closed door, wherein the system is configured to execute the method of securely opening a door connected to a system including a central unit, a mobile terminal, a local control unit and a door opening device for the door that are configured to transmit data among one another, the method including transmitting a first key to the mobile terminal by the central unit, transmitting a received first key to the local control unit by the mobile terminal via the door opening device, generating a second key by the local control unit depending on the first key, transmitting the second key from the local control unit to the mobile terminal via the door opening device, generating a third key by the mobile terminal depending on the second key, transmitting the third key to the central unit by the mobile terminal via the door opening device, and controlling opening of the door depending on the third key by the central unit by transmitting a request to the door opening device, the system including a central unit, a mobile terminal, a local control unit and a door opening device, wherein the door opening device connects to each of the central unit and the local control unit in a signal-technical manner, the central unit is configured to generate a first key and transmit the first key to the mobile terminal, the mobile terminal is configured to transmit the first key to the door opening unit, the door opening unit is configured to transmit the first key to the local control unit, the local control unit is configured to generate a second key depending on the first key and transmit the second key to the mobile terminal via the door opening device, the mobile terminal is configured to generate a third key depending on the second key and transmit the third key to the central unit via the door opening device, and the central unit is configured to control opening of the door by the door opening device depending on the third key.

DETAILED DESCRIPTION

Figure 1:
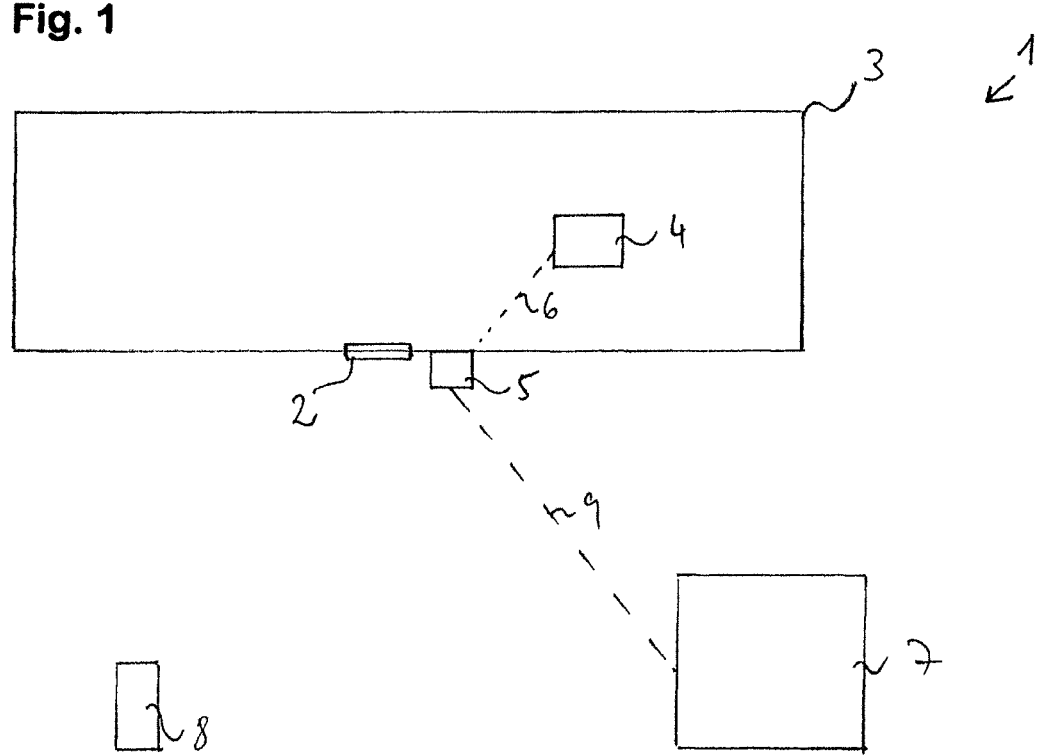
FIG. 1 schematically shows a system that securely opens a door.

It will be appreciated that the following description is intended to refer to specific examples of structure selected for illustration in the drawings and is not intended to define or limit the disclosure, other than in the appended claims.

I provide a method of securely opening doors. We will, however, generally refer to opening "a door" hereinafter. The door is a door of a flat or a door of a house, for example. The system comprises a central unit, a mobile terminal, a local control unit as well as a door opening device for the door. The described components are configured for data exchange among one another. The data exchange ensues in a signal-technical manner and is effected in a wired and/or wireless manner. The method comprises the following steps:

transmitting a first key to the mobile terminal by the central unit;

transmitting the received first key to the local control unit by the mobile terminal via the door openings device;

generating a second key by the local control unit depending on the first key;

transmitting the second key from the local control unit to the mobile terminal via the door opening device;

generating a third key by the mobile terminal depending on the second key;

transmitting the third key to the central unit by the mobile terminal via the door opening device; and controlling opening of the door by the central unit depending on the third key by transmitting a request to the door opening device.

For example, the central unit is a central entity that manages and controls opening the door. For example, it is a central management unit or an emergency center. Typically, the central unit manages and controls further doors of this type.

The central unit initiates the method of opening a predetermined door. For example, the method is initiated because of an emergency signal or alarm received in the central unit. Alternatively, the central unit initiates the method for other reasons or events.

First, the central unit transmits a first key to the mobile terminal. For example, in an alarm, an emergency center can communicate to an emergency medical service that access to a flat is required. The first key enables logging in to the flat via the mobile terminal. The mobile terminal transmits the first key to the local control unit via the door opening device. The local control unit is a control device located inside a flat or part of a house to which access is to be permitted. The door opening device has means, e.g., a camera, speakers, microphone or the like, to receive the first key and transmit it to the local control unit in a signal-technical manner. The control unit generates a second key, e.g., a random key depending on the first key, and transmits this key back to the mobile terminal via the door opening device. The mobile terminal then generates a third key depending on the second key, which is transmitted back to the central unit via the door opening device. This transmitting back can also be effected via the local control unit. Generation of the third key is effected by a suitable software application on a smartphone, for example. Depending on this third key, the central unit now controls opening of the door by a corresponding request that includes information to open the door.

The method contributes to the fact that a door can be securely opened without a physical key. This is particularly advantageous in emergency situations when quick access to a flat or a building is required. Access to a door can be granted by a central entity, namely the central unit. In particular, the central unit may grant access to certain people or groups of people equipped with a mobile terminal. The method enables high security so that, e.g., the first key cannot be misused in a non-authorized copy so that non-authorized third parties get access to the flat.

The basic functionality is that people get access to the flat by presenting the first key and receiving a second key as a reply and generate a third key from these two keys. As a result, access can be personalized and is copy-safe.

The local control unit may verify the transmitted first key and generates the second key depending on the verification. This makes it possible that the local control unit detects non-authorized requests to access the flat. If appropriate, the local control unit interrupts or terminates the method. Additionally or alternatively, the control unit communicates the non-authorized access request to the central unit. Optionally, the local control unit triggers an alarm, e.g., at the door opening device.

The central unit may verify the transmitted third key of the mobile terminal and generates the request for the door opening device depending on the verification. Thus, in analogy to the above, it is possible for the central unit to detect non-authorized access. In particular, the central unit determines whether the correct person or group of persons is about to obtain access to the flat.

The first key may include time information, user information and/or device information. For example, it is possible by the time information to grant access to the flat to the predetermined person or group of persons for a specified time interval, e.g., one or two hours. If this person or group of persons does not log-in to the door opening device within the specified time by transmitting the first key to the local control unit, getting access to the flat is not possible. By the user information and/or device information, a certain user or a certain mobile terminal is granted access to the flat. In other words, this allows preventing third parties from obtaining access to the flat by copying the first key.

The local control unit may comprise a timer and adds a time component to the second key. This enables generating a time-dependent second key. In other words, the second key comprises a time stamp. This contributes to temporally-restrict the access.

The second key may be output as an audio signal via a speaker of the door opening device and received via a microphone of the mobile terminal. This contributes to an increased security of the method. In particular, it is required for the mobile terminal to be configured to receive audio-based signals and to be capable of processing them into the third key together with the first key. For example, the mobile terminal comprises a corresponding software application, as mentioned above.

The first and/or the second key may be/is/are a QR code or include(s) audio data.

It may be possible to control the opening of the door manually via the local control unit. For example, the person in the flat can control the opening of the door independently from the central unit. For example, this is effected by communication via the door opening device via the person who wants to have access to the flat. Thus, this is effected via remote control. Additionally or alternatively, this is ensues via video communication. To that end, the local control unit may comprise a screen or display and/or operating elements, for example. Alternatively or additionally, the local control unit can be controlled via a data communication to a mobile device or another device of the user. This enables controlling the opening of the door from a bed of the resident. Opening the door is controlled, for example, after the doorbell rings or after receiving the first key.

The opening process may be logged. For example, the central unit and/or the local control unit may record the process of the door opening so that it is comprehensible who obtained access to the flat when and how. Furthermore, it is possible that certain events are checked depending on the door opener. For example, the central unit is capable of recording that certain proper services have been performed in the flat. For example, the central unit can determine that "meals on wheels" have been delivered on time.

Voice and/or audio communication may be effected with the central unit via the door opening device. As a result, the central unit can make sure by vision or linguistics whether the correct person or group of persons requires access to the flat despite the transmission of the key.

Furthermore, a system that securely opens doors is described, wherein the system is configured to perform the above described method. The system comprises a central unit, a mobile terminal, a local control unit as well as a door opening device. The door opening device is respectively connected to the central unit and the local control in a signal-technical manner. The central unit is configured to generate a first key and transmit it to the mobile terminal. The mobile terminal is configured to transmit the first key to the door opening unit. The door opening unit is configured to transmit the first key to the local control unit. The local control unit is configured to generate a second key depending on the first key and transmit it to the mobile terminal via the door opening device. The mobile terminal is configured to generate a third key depending on the second key and to transmit it to the central unit via the door opening device.

The central unit is configured to control an opening of the door by the door opening device depending on the third key.

The system essentially allows for the above-mentioned advantages and functions.

All of the above-described features with reference to the method can also be part of the described system and can be analogously combined to the above in any manner.

Further advantages to configurations are disclosed in the following, detailed description of an example.

The example will hereinafter be described with reference to the attached drawings. Like or equivalent elements are indicated with like reference numerals throughout the drawings.

FIG. 1 schematically shows a system 1 configured to securely open a door 2 of a flat 3. Instead of the flat 3, this may also be a building or a section of a building or the like, to which access is to be granted via the closed door 2. A local control unit 4 is provided inside the flat 3. Furthermore, the flat 3 has a door opener device 5. The door opener device 5 connects to the local control unit 4 for data exchange via a communication connection 6 (shown with dashes). In the example, the communication device 6 is cable-based, e.g., via a local area network (LAN) connection. However, a wireless connection, e.g., via a wireless local area network connection, is also possible.

In the example, the door opener device 5 has a video camera, one or multiple speakers, one or multiple microphones as well as a door opening means and/or door opening elements, that can open and/or lock the door 2. The door opening device 5 can be regarded as a so-called "internet of things" development.

The local control unit 4 is a unit arranged inside the flat 3. For example, the local control unit is manually operable and comprises the functions of an interphone system for communication with the door opener device 5. Additionally or alternatively, it may function as a kind of control device or router, with which communication can be effected via another device (e.g., a tablet or a smartphone) in a signal-technical manner, in analogy to the above.

Furthermore, the system 1 comprises a central unit 7 arranged at a spatial distance from the flat 3. In the example, the central unit 7 is an emergency center or a service center that centrally monitors and controls multiple flats of the type of the flat 3 described. Furthermore, the central unit 7 remotely controls access to the flat 3, e.g., in an emergency or due to other events. For example, such an emergency exists if a person living in the flat 3 is detected to be lying in the flat in a motionless manner or if the person himself/herself made an emergency call, which is received by the central unit 7.

Furthermore, the system 1 comprises a mobile terminal 8 such as a smartphone in the example. Alternatively, the mobile terminal is a tablet computer or the like. The mobile terminal 8 is assigned to a person or a group of persons who wants to have access to the flat 3 or to whom access to the flat 3 is to be granted.

Figure 2:
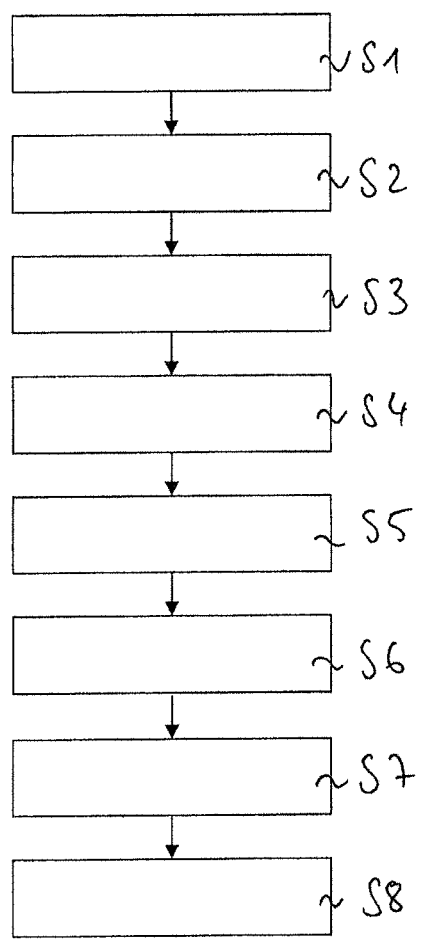
FIG. 2 shows a schematic flow chart of a method for the system of FIG. 1.

Hereinafter, a method that ensures secure access to the flat 3 without the necessity of a physical door key for the door 2 will be described with reference to FIG. 2. The method is initiated by a predetermined event, as described above. In the example, the central unit 7 receives an emergency call from the flat 3 in a step S0.

In a step S1, the central unit transmits the request of going to flat 3 to a person or a group of persons to help the person in trouble. Incidentally, the central unit transmits a first key that can also be referred to as a temporary key, to the mobile terminal 8, which is assigned to the respective person or group of persons. The first key can contain the request to go to the flat 3, or the request is a separate step, preceding the step of transmitting the first key. Hereinafter, reference is made to one person requesting access to the flat. The same applies to a group of persons.

The first key has information about the person and device information of the mobile terminal 8 used by the person. In other words, the first key is personalized. Thus, the first key is generated in a user-dependent manner, e.g., by user-specific information data. For example, personalization of the first key is effected by a public key assigned only to the certain person or group of persons. This public key can be used to generate a second key, for example, as will be described later.

The first key and the further keys are data-type keys. For example, a key represents a generated bit combination that carries information. If applicable, this information needs to be decrypted. In other words, the term key does not only include a key to encrypt plain text, but also the transmitted information per se, e.g., in the encrypted form. Key generation is effected by mathematical methods and/or via random numbers, for example.

The first key is generated also based upon time information. For example, this time information may include the current time as well as information of how long and at what time access to the flat 3 is to be granted. For example, the central unit 7 enables access to the flat 3 for the next two hours. This contributes to an increased security of the described system 1 and the method, respectively.

In a next step S2, the person who wants to have access to the flat 3 receives the first key by the mobile terminal 8 (not shown in the drawings).

Depending on his or her current location, the person goes to flat 3 to get access.

In a next step S3, the person logs into the door opening device 5 with the mobile terminal 8 and transmits a first key to the door opening device.

In the example, the first key is a quick response (QR) code, a two-dimensional code.

As described above, the door opening device 5 has a camera so that the camera is capable of reading or detecting the first key.

Alternatively, the first key can be transmitted to the door opener device 5 in a different manner. For example, the first key is audio-based and transmitted to the door opener device 5 in the form of audio data via a speaker of the mobile terminal 8, the door opener device recording the audio data by a microphone.

In a next step S4, the door opener device transmits the first key to the local control unit 4 inside the flat.

The local control unit 4 generates a second key depending on this first key, which is transmitted back to the mobile terminal 8. Optionally, the local control unit 4 verifies the first key and, after that, generates the second key. For example, the verification may include evaluation of the time information and/or validation of the device and user data. The public key (see above) is used to generate the second key, for example. Thus, for example, the second key includes the public key and random numbers or encrypted information generated from the public key and the first key.

In the example, the second key is an audio-based key. The audio-based key includes audio data, which is output via the speaker of the door opener device 5. As an alternative, the second key can be transmitted in a different way, for example, by a QR code, as described above.

In a next step S5, the mobile terminal 8 receives the second key, in that the terminal receives the audio-based second key via the microphone. In other types of second keys, reception can be effected by the camera of the mobile terminal 8, for example.

The mobile terminal 8 having a suitable software application adapted to the system 1 of the method, converts this second key, which can also be referred to as a random key, into a third key together with the first key. For example, the mobile terminal 8 decrypts the second key to obtain information by which the third key is generated. For example, when using the public key (see above), the second key can only be decrypted by a private key of the mobile terminal 8. This significantly contributes to the security of the method and the system.

For example, the private key is stored in the suitable software application. Optionally, the private key is secured, e.g., by a password, fingerprint, PIN or the like.

In a further step S6, the mobile terminal 8 transmits the third key back to the door opener device 5. The third key is another QR code, for example. The third key is transmitted to the central unit 7 via the door opener device 5. In the example, the door opener device 5 per se establishes a communication connection 9 to the central unit 7 to that end. Alternatively, the third key is transmitted from the door opener device 5 to the central unit 7 via the local control unit 4 and a corresponding communication connection.

In a next step S7, the central unit 7 verifies the third key, the central unit taking into account the information of the sending device, namely the mobile terminal 8.

If the verification is positive, e.g., if the central unit 7 determines that the person who wants to have access to the flat 3 is the correct person, it sends a corresponding request to the door opener device 5 and controls and opening of the door 2. Depending on this request, the door opening device 5 opens the door 2 in a next step S8 so that access is granted.

To sum up, the first key contains information about who is permitted access when and how long. The second and third key serve for the reliable identification of the person or group of persons.

As described above, the described method enables secure and quick access to the flat without a physical key. Due to the fact that multiple keys are exchanged, it is not possible to copy, e.g., the first key and obtain access to the flat by a different mobile terminal since the central unit 7 as well as the local control unit 4 always verify and generate the second key and the third key, respectively, depending on transmitted device information.

Optionally, the described method is logged. The local control unit 4 and/or the central unit 7 record the entire process, i.e., what devices and persons want to have access to the flat at what time. Optionally, certain services such as "meals on wheels" or postal deliveries can be logged so that a verification can be made as to whether a corresponding service was performed properly or not.

Optionally, it is also possible that the central unit 7 communicates with the person(s) who want to get access to the flat 3. For example, a voice communication in the type of a telephone connection can be established via the door opener device 5. Additionally or alternatively, video communication with the respective person can take place. This increases security in the method.

In the example, the door opener device 5 electrically connects to a power supply. Alternatively or additionally, the door opener device 5 has a battery operation so that access to the door can be granted even in a power outage. This can be advantageous, for example, if parts of the flat 3 are destroyed due to fire.

Alternatively, if the door opener is provided at a garden door or a garage entrance, the door opener device 5 may have a battery or accumulator operation, wherein the accumulator is charged by movement of the door. Thus, the door opener device 5 disposes of means enabling charging of the accumulator by movements. Basically, the door opener device 5 requires little energy since the energy-consumers such as a camera, speakers or microphone or the like are actuated and have to be turned on only when needed.

The described system 1 or the corresponding method do not exclude a physical door key from being able to open the door 2. On the one hand, older people are to have the option to deal with the new technology, for example. Further, such a key serves as an emergency key, if technology fails. In addition, it can be desired that access is not logged.

The case described in the example is a case of emergency. However, the method is also suitable for other applications. For example, the method can be used in hotels, wherein a front desk is dispensed with, and access to the rooms is controlled via a central entity such as the central unit 7. Delivery services such as postal services can also benefit from such a system. Thus, access to rental homes, which are typically locked by a front door, can be temporarily granted.

Although the methods and systems have been described in connection with specific forms thereof, it will be appreciated that a wide variety of equivalents may be substituted for the specified elements described herein without departing from the spirit and scope of this disclosure as described in the appended claims.

The invention claimed is:

1. A method of securely opening a door connected to a system comprising a central unit, a mobile terminal, a local control unit and a door opening device for the door that are configured to transmit data among one another, the method comprising:
    transmitting a first key to the mobile terminal by the central unit;
    transmitting a received first key to the local control unit by the mobile terminal via the door opening device;
    generating a second key by the local control unit depending on the first key;
    transmitting the second key from the local control unit to the mobile terminal via the door opening device;
    generating a third key by the mobile terminal depending on the second key;
    transmitting the third key to the central unit by the mobile terminal via the door opening device; and
    controlling opening of the door depending on the third key by the central unit by transmitting a request to the door opening device.

2. The method according to claim 1, wherein the local control unit verifies the transmitted first key and generates the second key depending on the verification.

3. The method according to claim 1, wherein the central unit verifies the transmitted third key of the mobile terminal and generates the request for the door opening device depending on the verification.

4. The method according to claim 1, wherein the central unit detects a non-authorized opening of the door by the third key.

5. The method according to claim 1, wherein the first key includes time information, user information and/or device information.

6. The method according to claim 1, wherein the local control unit comprises a timer and adds a time component to the second key.

7. The method according to claim 1, wherein the second key is output as an audio signal via a speaker of the door opening device and is received by a microphone of the mobile terminal.

8. A system that securely opens a closed door, wherein the system is configured to execute the method according to claim 1, the system comprising a central unit, a mobile terminal, a local control unit, and a door opening device; wherein the door opening device connects to each of the central unit and the local control unit in a signal-technical manner;

the central unit is configured to generate a first key and transmit the first key to the mobile terminal;

the mobile terminal is configured to transmit the first key to the door opening device;

the door opening device is configured to transmit the first key to the local control unit;

the local control unit is configured to generate a second key depending on the first key and transmit the second key to the mobile terminal via the door opening device;

the mobile terminal is configured to generate a third key depending on the second key and transmit the third key to the central unit via the door opening device; and the central unit is configured to control opening of the door by the door opening device depending on the third key.

9. The system according to claim 8, wherein the first key is a QR code or includes audio data.

10. The system according to claim 8, wherein the second key is a QR code or includes audio data.

11. The system according to claim 9, wherein the second key is a QR code or includes audio data.

* * * * *